United States Patent
Yasukawa et al.

(10) Patent No.: US 9,306,950 B2
(45) Date of Patent: Apr. 5, 2016

(54) METHODS, SERVER AND PROXY AGENT FOR DYNAMICALLY SETTING UP A SESSION BETWEEN A TARGET RESOURCE IN A PRIVATE NETWORK AND AN APPLICATION ON A DEVICE

(75) Inventors: Kenta Yasukawa, Kanagawa (JP); Stefan Avesand, Huddinge (SE); Johan Hjelm, Tokyo (JP); Takeshi Matsumura, Tokyo (JP); Shingo Murakami, Kanagawa (JP); Toshikane Oda, Tokyo (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 164 days.

(21) Appl. No.: 14/117,594

(22) PCT Filed: May 13, 2011

(86) PCT No.: PCT/SE2011/050606
§ 371 (c)(1),
(2), (4) Date: Nov. 13, 2013

(87) PCT Pub. No.: WO2012/158073
PCT Pub. Date: Nov. 22, 2012

(65) Prior Publication Data
US 2014/0208393 A1  Jul. 24, 2014

(51) Int. Cl.
*G06F 17/00* (2006.01)
*H04L 29/06* (2006.01)
*H04L 29/12* (2006.01)
*H04L 29/08* (2006.01)

(52) U.S. Cl.
CPC .......... *H04L 63/10* (2013.01); *H04L 29/12509* (2013.01); *H04L 29/12566* (2013.01); *H04L61/2567* (2013.01); *H04L 61/2589* (2013.01); *H04L 67/02* (2013.01); *H04L 67/14* (2013.01); *H04L 67/2814* (2013.01)

(58) Field of Classification Search
CPC .............. H04L 63/10; H04L 29/12509; H04L 29/12566; H04L 61/2567; H04L 61/2589; H04L 67/02; H04L 67/14; H04L 67/2814; H04L 63/083; H04L 63/0869; H04M 3/42246; H04W 12/06; H04W 12/08; H04W 16/14; H04W 16/16; H04W 36/0066; H04W 36/14; H04W 36/18; H04W 4/16; H04W 74/00; H04W 8/12
USPC .......................................................... 726/4
See application file for complete search history.

(56) References Cited

U.S. PATENT DOCUMENTS 6,901,553 B1 * 5/2005 Hayashi ............ G06F 17/30861
707/E17.107
2007/0180081 A1 8/2007 Okmianski et al.

OTHER PUBLICATIONS

Jesus Saez Gomez-Escalonilla et al: "A gateway-based solution for remote accessing to residential UPnP services networks", 8th Workshop on, IEEE, Piscataway, NJ, USA, Jul. 8, 2010, pp. 29-34, XP031732558, ISBN: 978-1-4244-5715-1.*
Gomez-Escalonilla et al. "A gateway-based solution for remote accessing to residential UPnP services networks" Intelligent Solutions in Embedded Systems (WISES), IEEE, 2010, 6 pages.
Russell et al. Remote Access Architecture:2 For UPnP Version 1.0, 2011, XP55018796, retrieved from the Internet:URL:http://upnp.org/specs/ra/UPnP-ra-RAArchitecture-v2.pdf, 49 pages.
Mahy et al. Traversal Using Relays around NAT (TURN): Relay Extensions to Session Traversal Utilites for NAT (STUN), RF5766.txt, Internet Engineering Task Force (IETF); Standard, ISSN: 2070-1721,Internet Society (ISOC), 2010, 67 pages.
Ericsson Labs Web Device Connectivity,Version 1.0, 2010, 18 pages.
Ericsson Labs Web Connectivity,Version 1.0, 2010, 66 pages.

* cited by examiner

*Primary Examiner* — Dant Shaifer Harriman
*Assistant Examiner* — Abiy Getachew
(74) *Attorney, Agent, or Firm* — Patent Portfolio Builders, PLLC

(57) ABSTRACT

An object of embodiments of the present invention is to establish a secure connection from a device to a private network, to which the device belongs, when the device may be located remotely from the private network. This is achieved by locating a server in the private network while reusing existing authorization mechanisms in the network. A target resource is in this private network and a device located outside the private network can access the target resource by using the server and a proxy agent which intermediates a request from the device by using a one time session URL.

16 Claims, 6 Drawing Sheets

METHODS, SERVER AND PROXY AGENT FOR DYNAMICALLY SETTING UP A SESSION BETWEEN A TARGET RESOURCE IN A PRIVATE NETWORK AND AN APPLICATION ON A DEVICE

CROSS REFERENCE TO RELATED APPLICATION(S)

This application is a 35 U.S.C. §371 National Phase Entry Application from PCT/SE2011/050606, filed May 13, 2011, designating the United States, the disclosure of which is incorporated herein in its entirety by reference.

TECHNICAL FIELD

The embodiments of the present invention relate to methods, a server and a proxy agent for secure remote access for private resources in an Internet protocol (IP) network.

BACKGROUND

People today use multiple digital devices which are interconnected by various kinds of Local Area Network (LAN) and Personal Area Network (PAN) technologies. Examples of digital devices are home media servers. Many users want to access the home media servers from remote locations. Since those devices are usually connected to private LANs and in most cases, people wants to keep the contents private, there has to be a way to establish a private connection securely from the remote locations.

There are both proprietary and standardized solutions for accessing devices which are connected in a private network from a remote location.

An example is ETSI TISPAN (Draft ETSI TS 185 005 v3.2.2) which has specified IMS-based remote device access. It specifies a procedure to securely establish a tunnel to access devices in a private network from remote by Internet Protocol Multimedia Subsystem (IMS) signaling. As a result of the IMS signaling, port mapping is created by Universal Plug and Play (UPnP) or a Transmission Control Protocol (TCP) tunnel is setup.

Web technologies have evolved dramatically in last several years. With the help of technology evolution, web browsers are becoming an important software platform, rather than just one of applications.

It has an important advantage to develop an application so that it works on web browsers, that is, the application will become hardware or operating system independent. For example, once we write an application which works on a modern web browser, it works on computers with any of major operating systems. Moreover, it even works on mobile and embedded devices as far as the platform has a modern web browser.

However, the issue of addressing web clients for sending messages to them is lacking in the current web technologies. Since HyperText Transfer Protocol (HTTP) was developed on server-client model, only servers have addresses, i.e. HTTP Uniform Resource Locators (URLs), and clients cannot be addressed from a server until they access the server. WARP (Ericsson Labs, "Web Connectivity", https://labs.ericsson.com/apis/web-connectivity/connectivity/ is a technology developed by Ericsson Research which addresses the issue and make web clients addressable. WARP clients are authenticated by WARP server and assigned an address. Once an address is assigned, any clients and servers on the WARP domain can send message to each other. WARP also provides web technology with session management, authentication and message integrity. A Web Device Connectivity (WDC) API is developed by using WARP. The API enables to blend connected devices in web pages and to use them seamlessly as if those devices are part of web resources. For example, the user can drag and drop a Youtube video link to an icon which represents a DLNA enabled TV to instruct the TV to play it out.

FIG. 1 shows a high-level Web Device Connectivity (WDC) architecture. A private network 100 is established and connected to the Internet 142 and Warp network 140 via an IP router 130. The private network 100 comprises a plurality of devices 110 such as DLNA devices which are connected to a Personal Network gateway (PN Gw) 120. As can be seen in FIG. 1, Warp is used as an underlying messaging system between a web application, the personal network (PN) gateway 120, and PN Application Server (PNAS) 180.

The web application on a device 150 also referred to as client is exemplified by an HTML/CSS/Javascript application running on a web browser which is loaded from arbitrary web sites 170. One example of a Web application is a Social Networking Service (SNS) application which is loaded from a SNS site such as Facebook.

The PNAS is an in-cloud server which consists of the following sub components:

A context manager (CM) 192, which is a database to maintain context information of devices or PN context. It also notifies other enablers, such as the PN gateway 120, a Service Broker 190 and an identity, authentication and authorization (ID/AA) unit 194 of changes in the contexts. The PN context and context addressing are so designed to make good use of the way of accessing resources in Warp.

The service broker (SB) 190 receives a request via a WDC API 145 to control devices and dispatches it to the PN gateway after policy enforcement.

The ID/AA unit 194 is used when WDC is used in conjunction with SNS. It stores identity mapping between SNS identity, Warp user identity, and PN ID of each user. It maintains the policies created by the end users and social relation in SNS is also taken into account when authorizing device access requests.

The PN gateway 120 is a service gateway attached to each user's LAN and has the following three functions: discovery of devices in the LAN, publishing the information regarding discovered devices to the context manager (CM) and controlling devices according to requests from the service broker (SB).

The following describes a scenario in the WDC architecture.

1. When the user starts a web application on a web browser, the user loads his/her context information including available device lists from CM at PNAS.
2. When the user performs an operation which triggers a device to perform an action, e.g. playing back a media content, an action request is issued from the application to the SB at the PNAS.
3. The SB looks up a PN gateway which is responsible for the received action and dispatches it.
4. The PN gateway executes the action on the specified device.

Another issue in remote access is NAT traversal. Most private networks are behind a Network Address Translation (NAT) and/or a firewall and hence hosts inside such a private network are not directly reachable from the external network.

Many techniques exist, but no single method works in every situation since the NAT behavior is not standardized.

Although there are various solutions for accessing devices in private networks from remote locations, they have difficulty to offer services in which the device access is blended as part of web experience.

In order to offer services with the above mentioned web experience, there are three major issues that need to be solved. Firstly, enabling exchange of signaling messages between a web browser which works as a remote access client and target devices and secondly authentication and authorization of signaling messages between web browsers and target devices. As the third issue, media transport sessions have to be established between the media server and the client.

Since WARP provides an address to each WARP client and if there is a PN gateway component which intermediates communication between devices and web browsers by bridging device specific protocols and WARP, respectively, the first issue is solved.

The second issue is also solved by WARP because each WARP client is authenticated by WARP server and message integrity is assured. So by having a simple access list at the gateway component, authentication and authorization are enabled.

However, messages over WARP always traverse the WARP server and thus it is not appropriate to use WARP for transporting the actual media. For example, in case of accessing a video content stored in Digital Living Network Alliance Network (DLNA) Digital Media Servers (DMS) at home, all the video stream needs to be handled by the WARP server. It will generate unnecessary load on the WARP server and the network. In case the network distance between the WARP server and a media server and/or a client is long, it does not only increase latency between the server and client, but also increase load on the path and possibility of QoS degradation.

SUMMARY

An object of embodiments of the present invention is to establish a secure connection from a device to a private network, to which the device belongs, when the device may be located remotely from the private network.

This is achieved by locating a server and a proxy agent in the private network while reusing existing authorization mechanisms in the network. A target resource is in this private network and a device located outside the private network can access the target resource by using the server and the proxy agent which intermediate a request from the device by using a one-time session URL issued by a session anchor.

According to a first aspect of embodiments of the present invention, a method in a server of a private network for dynamically setting up a session between a target resource in the private network and an application on a device is provided. The device belongs to the private network but may be located remotely from the private network. In the method, a request is received from the application to get the target resource in the private network. It is checked if a user of the device is authorized to access the server and a session anchor is identified. A proxy agent within the private network is instantiated with address information of the identified session anchor such that the proxy agent can establish a connection to the session anchor identified by said address information. Further, a session URL is received in response to said instantiating and a mapping between an URL of the target resource and a session URL issued by said session anchor is performed. It is then determined whether the device and the target resource is on the same LAN such that the application can access the target resource directly if they are on the same LAN, or such that the application can access the target resource via the session anchor by using the session URL if they are not on the same LAN.

According to a second aspect of embodiments of the present invention a method in a proxy agent of a private network for dynamically setting up a session between a target resource in the private network and an application on a device is provided. The device belongs to the private network but may be located remotely from the private network and the application sends a request to a server in the private network to get the target resource and the server is configured to authorize a user of the device to authorize access to the server and an URL of a session anchor is identified by the server. In the method, a request to instantiate the proxy agent with address information of the identified session anchor is received. A session request is sent to the session anchor and a session URL is received from the session anchor. Accordingly, a mapping between said session URL and the target resource is stored. Furthermore, the session URL is sent to the server, such that the server can forward the session URL to the client and a request is received from the client via the session URL of the session anchor to get the target resource. The session URL is mapped to the URL of the target resource, and a request to get the target resource is sent, such that the target resource can be sent to the client.

According to a third aspect of the embodiments of the present invention a server of a private network for dynamically setting up a session between a target resource in the private network and an application on a device is provided. The device belongs to the private network but may be located remotely from the private network. The server comprises an input/output section configured to receive from the application a request to get the target resource in the private network, a processor configured to check if a user of the device is authorized to access the server to identify a session anchor to instantiate a proxy agent within the private network with address information of the identified session anchor such that the proxy agent can establish a connection to the session anchor identified by said address information. Further the input/output section is configured to receive a session URL in response to said instantiating and performing a mapping between an URL of the target resource and a session URL issued by said session anchor, and the processor is further configured to determine whether the device and the target resource is on the same LAN such that the application can access the target resource directly if they are on the same LAN, or such that the application can access the target resource via the session anchor by using the session URL if they are not on the same LAN.

According to a fourth aspect of embodiments of the present invention, a proxy agent of a private network for dynamically setting up a session between a target resource in the private network and an application on a device. The device belongs to the private network but may be located remotely from the private network. The application sends a request to a server in the private network to get the target resource and the server is configured to authorize a user of the device to authorize access to the server and an URL of a session anchor is identified by the server. The proxy agent comprises an input/output section configured to receive a request to instantiate the proxy agent with address information of the identified session anchor, to send a session request to the session anchor, and to receive a session URL from the session anchor. The proxy agent further comprises a memory configured to store a mapping between said session URL and the target resource, and the input/output section is further configured to send the session URL to the server, such that the server can forward the session URL to the client, and to receive a request from the client via the session URL of the session anchor to get the target resource. The proxy agent further comprises a processor which is configured to map the session URL to the URL of the target resource, and the input/output section is configured to send a request to get the target resource, such that the target resource can be sent to the client.

An advantage with at least one of the embodiments of the present invention is that it enables web browser based secure remote private resource access by establishing a media transport inheriting authentication and authorization provided by WARP.

A further advantage with at least one of the embodiments is that it works by utilizing a so-called rendezvous server also referred to as additional server and by selecting an appropriate session anchor dynamically. Because of that, the embodiment enables clients to establish a media transport session with a smaller overhead than using WARP to transport media flow.

A yet further advantage is that the embodiments are not limited to web browser based remote access and they can also be applied to Device-to-Device remote access.

DETAILED DESCRIPTION

It should be noted that the embodiments of the present invention are not limited to web browser based remote access although the scenarios exemplified herein relates to web browser remote access. Since web browser is a much more limited environment compared to native software execution environment, e.g. Linux, Windows, Android, iOS and so on, the embodiments of the present invention can be applied to any remote access application.

In the following, it is exemplified how the solution according to the embodiments can work under various conditions. Furthermore, in the rest of the specification, the embodiments are exemplified in the context of a Web application which accesses a target resource in a private area network, such as media content on home Digital Media Server (DMS) file in Network Attached Storage (NAS), video stream from surveillance camera, by establishing a connection exemplified by an HTTP connection. For simplicity, the Web application and the resource in a private network that the application is going to access are called the Web application and the target resource, respectively.

The embodiments described below require that the web application on the device that is requesting the target resource is addressable and that it can be authenticated. As mentioned above, that can be achieved by using Warp. It should however be noted that the embodiments are not limited to Warp. Other mechanisms with similar functionalities regarding addressability and authentication as Warp can also be used by the embodiments.

Embodiments of the present invention enable establishment of a secure connection from a device to a private network when the device belongs to the private network and when the device is in a remote location from the private network.

That is achieved by using a server located in the private network which intermediates requests for a target resource from a client.

A further embodiment enable establishment of a secure connection from a device to a private network when the device belongs to the private network and when the device may be in a remote location from the private network. I.e. it is not known whether the device and the target resource is located on the same LAN.

In this case, also an additional server, referred to as a rendezvous server is introduced according to an embodiment which is configured to determine whether the device is located remotely from the private network, i.e. whether the device is on the same LAN as the target resource or not.

Figure 1:
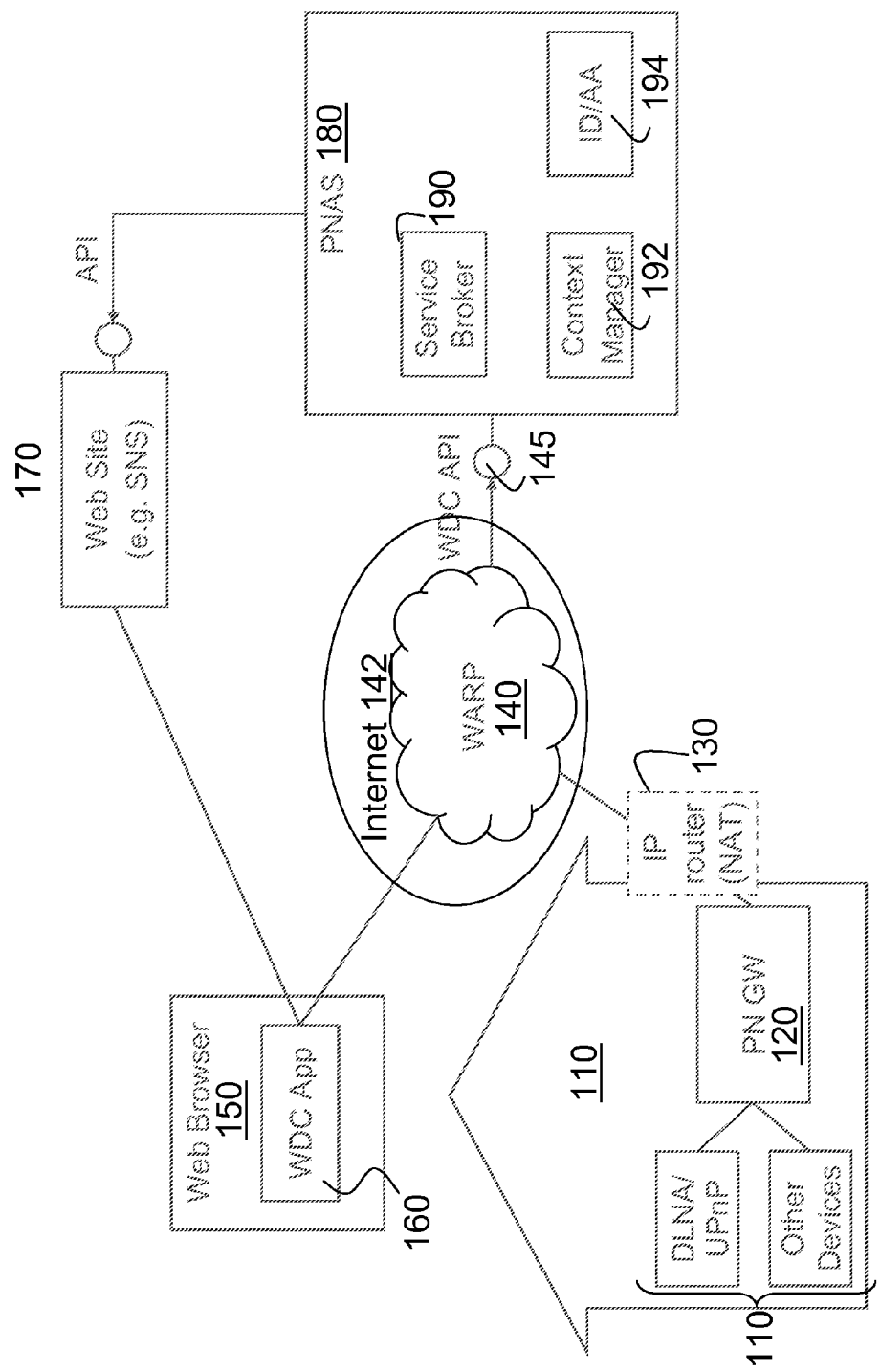
FIG. 1 shows a high-level Web Device Connectivity architecture according to prior art.
Figure 2:
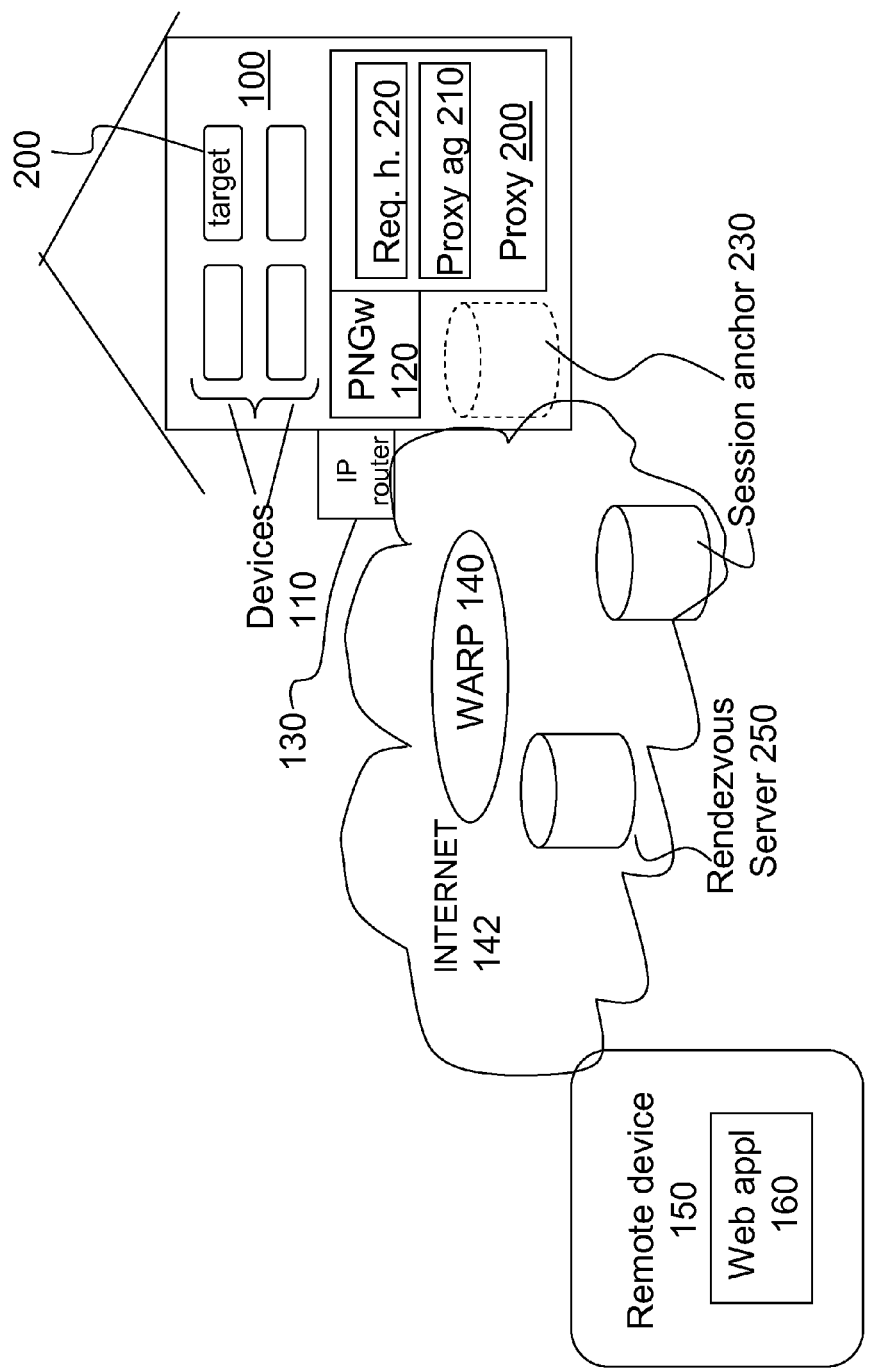
FIG. 2 shows a network according to embodiments of the present invention.

FIG. 2 illustrates a network wherein embodiments of the present invention are implemented. In FIG. 2, a private network 100 is established e.g. in a home. Different devices 110 within the private network are connected to a PN gateway 120. The PN GW 120 is further connected to an IP router 130 in order to reach the Internet. According to embodiments of the present invention, a proxy agent 210 and a server referred to as a request handler are included in the private network 100. A session anchor 230 is either located locally within the private network or outside the private network e.g. at the operator. The session anchor 230 is used for the proxy agent 210 to accept requests for a target resource 200. For example, in case the proxy agent 210 is behind a NAT without any possibilities to traverse it and if the proxy agent 210 neither has a port to accept incoming TCP connections, the proxy agent 210 cannot accept requests at all. By having a session anchor 230 outside the private network and making the proxy agent 210 connect to it, a proxy agent 210 behind the NAT can accept requests through the session anchor.

As described above, an additional server 250 is also used according to one embodiment to determine whether the device is located within the private network or outside the private network. The way that the device connects to the target resource depends on whether the client is located in the private network or not and it is described further below. In case it can be assumed that the device is aware of if it is located in the private network, then the additional server is not required. However, if it is a Web application that wants to access the target resource via a web browser, it can not determine whether the client and the target resource are on the same LAN, i.e. in the private network, then the additional server is required. The additional server is also referred to as a rendezvous server and this additional server may be located at the operator. As indicated in FIG. 2, the device may comprise a web browser and the user can connect to a web site or to the private network by using an application via the web browser.

Moreover, the proxy agent needs to be deployed in a location from where the target resource is reachable. Since a PN gateway is deployed in each private network to discover devices in the network by local protocols such as UPnP and Bonjour, it makes sense to deploy it with each PN gateway.

As an example, the request handler and the proxy agent are co-deployed in a proxy with a PN gateway in the embodiment described in conjunction with FIG. 2.

In the embodiments described herein, there is at least one session anchor which is always available. If a node (which hosts the PN gateway, request handler or the proxy agent) that resides in the target private network has a port which is reachable from the external network, e.g. it has a global IP address, it has a port statically mapped to a port of a global IP address, or it can make a port mapping by UPnP (Universal Plug and Play) IGD (Internet Gateway Device), the node creates an instance of local session anchor which can be used for establishing the session.

In other embodiments, session anchors are deployed in servers in a cloud which are reachable over the Internet.

Figure 3:
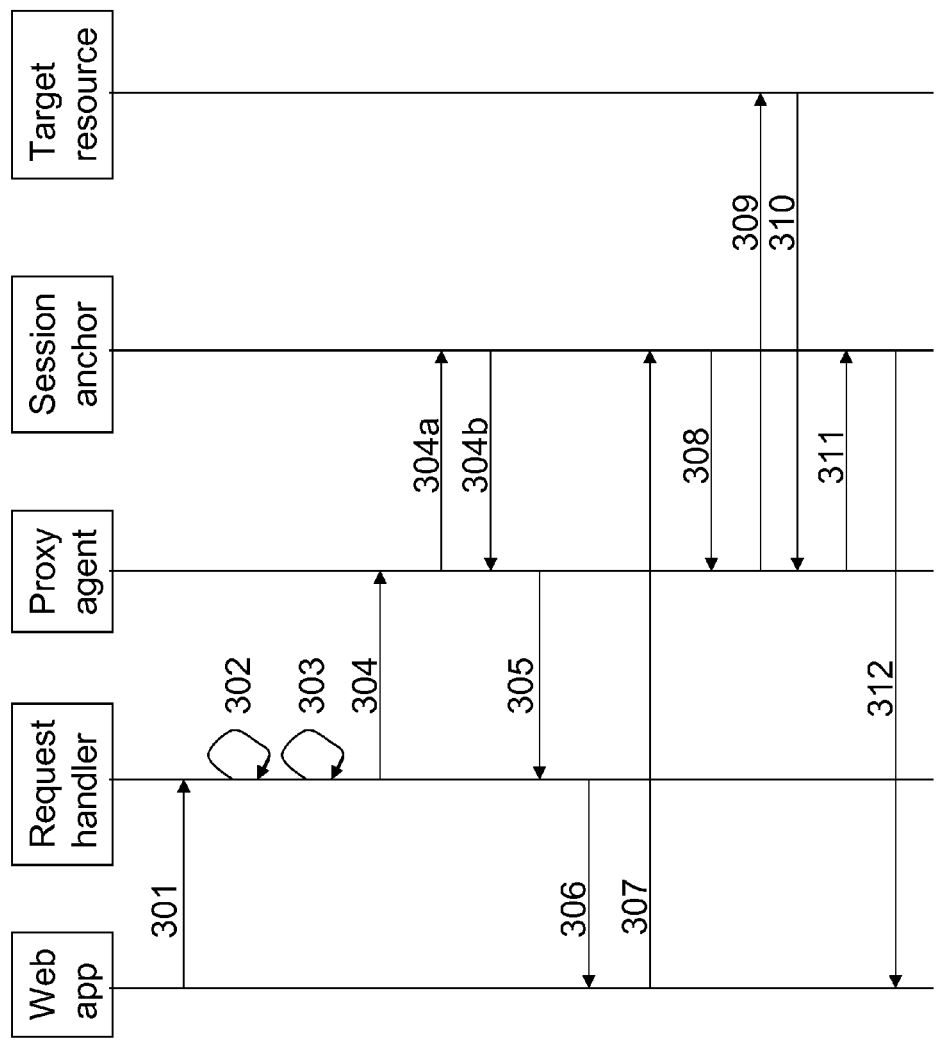
FIG. 3 is a signaling diagram exemplifying a method according to embodiments of the present invention.

One embodiment is now described in conjunction with FIGS. 2 and 3. In this embodiment, it is known that the device with the requesting web application is located remotely from the private network, i.e. the device and the target resource are on different LANs.

A private network comprising similar functions as the private network described in FIG. 2 is established and comprises a plurality of devices. One of the devices is a target resource 200 that an application of a requesting device 160 outside the private network wants to access. The requesting device 150 belongs to the private network 100 but is now located remotely. In accordance with embodiments, the private network 100 comprises two functional entities; a request handler 220 and a proxy agent 210. Different functionalities are divided between the request handler 220 and the proxy agent 210 but it should be noted that one or more logical or physical entities could perform the functionalities and the functionalities may be divided in another way. The functionalities of the proxy agent and the request handler may be implemented by a processor. Further, the request handler and the proxy agent are exemplified in FIG. 2 to be located in a proxy but the embodiments are not limited to that the request handler and the proxy agents are co-located in a proxy.

The device and its applications have somehow received information that it should request access to a target resource in the private network via the request handler. This information may have been obtained from a server in the private network. Thus, a web application on the device is configured to request 301a target resource from the request handler as illustrated by FIG. 3.

The request handler is configured to check 302 if the user of the device is authorized to access the request handler. The request handler is configured to reject the request and the sequence ends if it is not authorized.

Further, the request handler is configured to check 303 availability of a local session anchor. If a local session anchor is available, a local session anchor is selected. If no local session anchor is available, the request handler decides to use a session anchor in a cloud e.g. reachable via the Internet.

The request handler is configured to instantiate 304 the proxy agent with passing the URLs for the target resource and the URL of the selected session anchor.

The proxy agent is configured to send 304a a request to establish a connection to the session anchor and the session anchor is configured to issue an URL bound to the connection and to return 304b it to the proxy agent. This URL is a one-time URL used for only for this request and called a session URL in the following. The proxy agent is configured to perform and store a mapping between a URL of the target resource and the session URL issued by said session anchor.

Furthermore, the proxy agent is configured to return 305 the session URL to the request handler and the request handler is configured to send 306 a redirect message to the Web application with the session URL such that the client can access the target resource via the session anchor.

Hence, the Web application is configured to send the request 307 for the target resource to the session anchor. The session anchor is configured to check if it is the first request made for the session URL.

The session anchor comprises a memory for storing the source IP address for making it exclusive for that client. The source IP address is stored if it is the first request made for that session URL, otherwise it checks if the source IP address of the Web application is the same as the one registered. If they are different, it rejects the access. If they are same, the next step is performed. Accordingly the session anchor is configured to compare the source IP address of the Web application and the one that already is registered and to reject the access if they are different.

The session anchor is configured to forward 308 the request to the corresponding proxy agent over the connection previously established through the mapping such that the request can reach 309 the target resource.

Accordingly, the proxy agent is configured to map the request URL to the target resource such that the target resource can be provided 310, 311, 312 to the requesting device via the session anchor.

Figure 4:
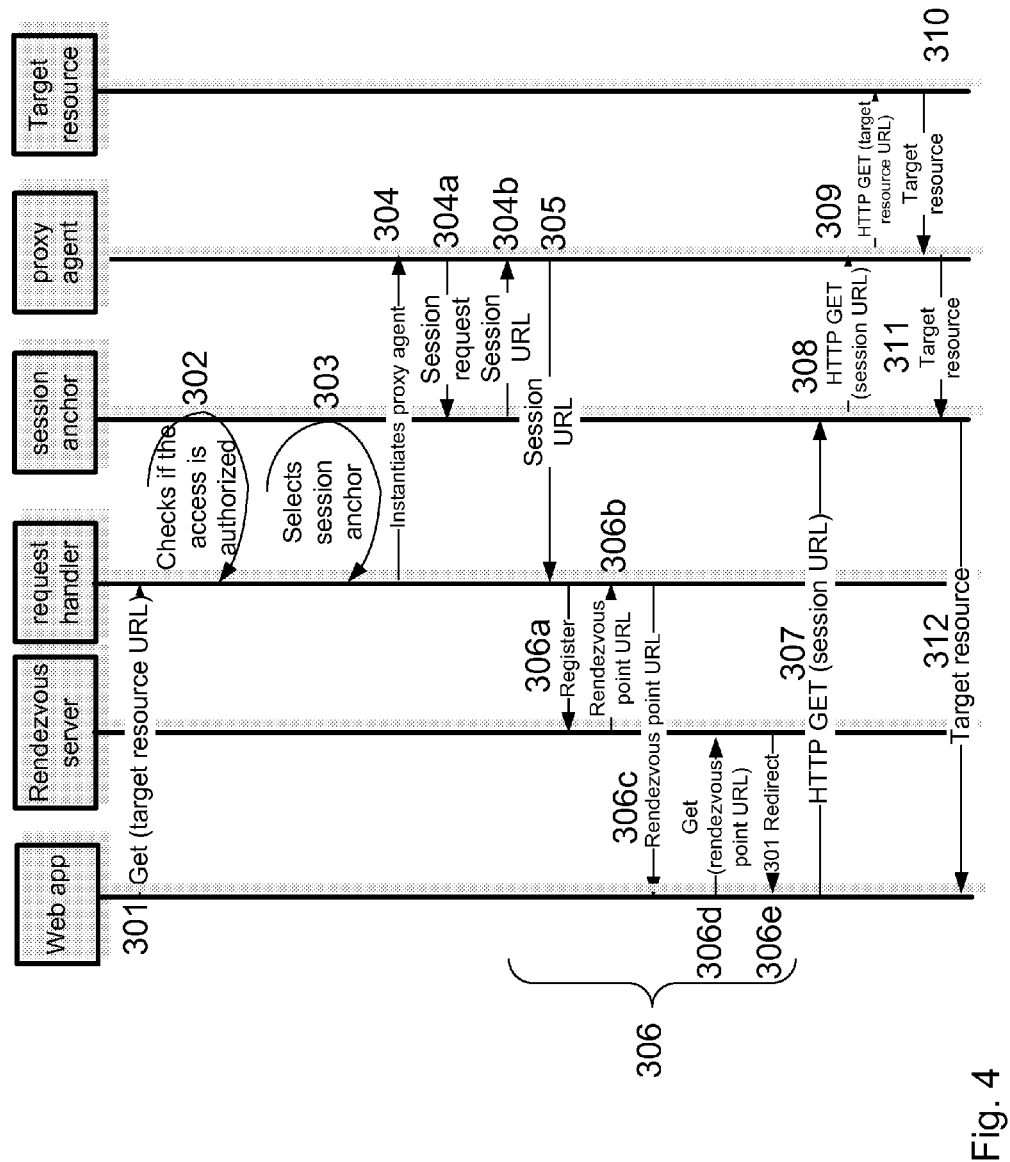
FIG. 4 is a signaling diagram exemplifying a method according to a further embodiment of the present invention.

Turning now to the signaling diagram of FIG. 4, which further explains an embodiment of the present invention in the context of an IP network having Warp functionality or similar functionality. The difference between this embodiment and the embodiment shown in FIG. 3 is that it is not known in advance if the requesting device and the target resource is on the same LAN. Moreover, the messages in FIG. 4 are exemplified with HTTP, but the embodiments are not limited to HTTP.

301. A web application in a device issues a request to get a target resource, e.g. an HTTP resource in a private network. The HTTP resource may be http://<DLNA DMS>/video.mpg). This request is sent to the server referred to as the request handler of the proxy. The web application may communicate with a server wherein the server informs the device to contact the request handler when requesting access to a target resource in the private network.

The request handler receives the request and

302. the request handler checks if the user of the web application is authorized to access the request handler. If not, the request handler rejects the request and the sequence ends, otherwise the following steps are performed:

303. The request handler checks availability of a local session anchor. If a local session anchor is available, a local session anchor is selected. If no local session anchor is available, the request handler decides to use a session anchor in the cloud.

304. The request handler instantiates a proxy agent of the proxy with passing the URLs for the target resource and the URL of the selected session anchor.

304a. The proxy agent sends a request to establish a connection to the session anchor.

304b. The session anchor issues an URL bound to the connection and returns it to the proxy agent. This URL is called a session URL in the following. The proxy agent performs and stores a mapping between a URL of the target resource and the session URL issued by said session anchor.

305. The proxy agent returns the session URL to the request handler.

306a. The request handler sends a request to register the session URL and the URL of the target resource to an additional server referred to as rendezvous server. (This request is referred to as a registration request in the following). Information of the additional server may be pre-provisioned at the request handler. This additional server is configured to check if the client is located within the private network. It should be noted that the request should be appropriately protected by e.g. Secure Socket Layer, so that a malicious party cannot steal the end point URL.

The request may look as follows:

```
POST /rendezvous
Content-Type: application/json
{external: http://a.b.c.d:8080/<sessionID>, internal:
http://192.168.1.200/video.mpg}
```

The rendezvous server stores: The session URL, the target resource URL, and the source IP address of the registration requester (i.e. the request handler in this case) into a persistent database. Further, the rendezvous server issues a URL for the stored entry and 306b. returns it as a rendezvous point URL to the request handler. The point URL is a one time URL issued by the server, e.g. http://ericsson.com/randezvous/23873420985 which is a random number that identifies the registered pair of URLs while the rendezvous server URL is something like: http://ericsson.com/randezous.

306c. The WARP request handler returns the rendezvous point URL to the origin of the request, i.e. the client.

306d. The Web application on the client can then issue a request to the rendezvous point URL.

It should be noted that in the case of accessing the target resource from a different device or application than the Web application, e.g. playing back content on a DLNA DMR instead of the Web application, it is possible to simply pass the URL to such a device or application and let it open the URL. The sequence works the same even in that case.

The rendezvous server looks up the data entry corresponding to the request URL and compares the source IP address of the web application that is accessing the target resource and the stored source IP address of the request handler.

If they are same, it means the Web application and the target resource server are in the same LAN, which implies that the client is in the private network. In this case: The rendezvous server issues DELETE request to the registered session URL (not shown in FIG. 3). The session anchor disconnects the connection between the corresponding proxy agent and itself. The proxy agent terminates and the session anchor removes the session URL and returns a successful response, e.g. 200 OK or 204 No Content.

306e. The rendezvous server sends 301 redirect with specifying the target resource URL in the "Location" header. Thus the request is redirected to the URL of the target resource, i.e. http://192.168.1.200/video.mpg in the above example.
[END of sequence]

If they are different, it means that the Web application on the client is performing a remote access. So it sends 301 redirect with specifying the session URL in the "Location" header.

The rendezvous server removes the data entry.

In case the external IP address of the requester changes after a rendezvous URL is generated, the requester cannot access the content. That is mainly why the rendezvous URL is created every time a resource is accessed, i.e. latency from registration to request is fairly small, e.g. a few hundreds ms to a few seconds.

307. The Web application is redirected to the session URL.

308.a The session anchor checks if it is the first request made for the session URL.

If it is the first time, it remembers the source IP address for making it exclusive for that client. Go to step 308b. If not, it checks if the source IP address of the Web application is the same as the one registered. If they are different, it rejects the access. If they are same, go to Step 1308b 308.b The session anchor forwards the request to the corresponding proxy agent over the connection established at step 304.

309-310. The proxy agent maps the request URL to the target resource that is passed when it is instantiated and issues the request and the target resource is received.

An example of a request that comes to the proxy agent:
HTTP 1.1/session/1234567
Host: session.anchor.net
Request that the proxy agent makes
HTTP 1.1/dms/video.mpg
Host: 192.168.1.3
. . . .

311-312. Then the proxy agent returns the response to the Web application via the session anchor.

It is important to return status code 301 at step 306e because the Web browser may issue more than one HTTP requests to get the target resource, e.g. in case of HTTP video streaming. If it was a temporal redirection such as the status code 302, the rendezvous server has to maintain the data entry for unpredictable period of time.

The session URL is generated for each request and the session URL is sent to the requester, e.g. the Web application on the client, so that only the authorized requester can receive knowledge of the URL and send requests to it. Also, when the first request to the session URL is received by the proxy agent, it remembers the IP address of the client and restricts the access so that only the same IP address can use this session URL. By doing so, the embodiments enable establishment of a transport session with inheriting the session, in particular, authentication and authorization from WARP, i.e. can establish media transport sessions between media server and client.

As described above, three functional components needed by the solution according to the embodiments of the present invention are the request handler, proxy agent and the session anchor. The request handler may be based on Warp functionality.

The request handler is an entry point for the signaling. It receives a request for the URL of the target resource and checks if the requester, i.e. the user of the Web application is authorized to access the request handler. If it is authorized, the request handler obtains a session URL which corresponds to the request and sends the session URL to the requester.

Since the requester is authorized and message integrity is assured by a server such as a WARP server, the request handler simply checks that the requester is authorized to access the target resource by looking into a pre-provisioned Access Control List or asking ID/AA in PNAS. How it is done is out of scope of the embodiments of the present invention.

As indicated above, the session anchor may either be located inside or outside the private network. The separation of the session anchor and the proxy agent is important not only for deployment flexibility, but also for making the solution work under any possible cases. For example, in case the proxy is behind a NAT and it does not have a port to accept an incoming TCP connection, it uses a session anchor which resides outside the NAT to overcome the situation. Such session anchor selection and link establishment is explained in more detail below.

Since requests towards a private network are handled, a session anchor needs to have at least one port for accepting incoming request over WAN. If the proxy resides on a node which has a global IP address assigned or has at least one port which can accept incoming TCP connections, it can use its internal HTTP session anchor. Such a local session anchor is better than using one in a remote node in terms of load distribution and latency because involving a remote node on the media path can cause a single point of failure and triangle routing problems.

However, such a local session anchor is not always functional. In case the proxy resides on a node behind NAT box with no port mapped, a local HTTP session anchor cannot accept incoming HTTP requests. In that case, it needs to use HTTP session anchor which can be reached from both the HTTP proxy and the requester, e.g. one in a cloud reachable over the Internet.

Having considered the above, the embodiments assume one or more session anchor(s) in clouds which are available for a proxy agent and a list of available session anchors are given to the proxy agent. It may prioritize the local session anchor, but in case the local session anchor is not functional, it chooses one from the list. The list may contain priority value for each session anchor entry to decide which session anchor to prioritize.

Furthermore, an additional server referred to as a rendezvous server is introduced according to one embodiment. If the Web application and the target resource are on the same LAN, that is a rather difficult case for the architecture to handle because there is no easy way for the Web application or the web browser to know if the target resource and the Web application are on the same LAN or not.

If the Web application could detect that it is on the same LAN as the target resource, it could simply access it directly. However, a web browser does not have a simple way to determine which LAN it is connected to or which nodes are on the same LAN. It is not even possible to get its own IP address especially in case it is behind a NAT box.

Because of this, the proxy needs to determine whether or not the Web application is in the same LAN as the target resource upon request. For the purpose, a "rendezvous server" is introduced which is used for detecting that and redirecting the Web application to an appropriate URL, i.e. either URL with external end point or the local/original URL.

In order to apply the embodiments of the present invention, the Web applications have to be able to pass a URL for a target resource to a request handler, i.e. we need a way for the requesting Web application to indicate the target URL to the request handler either implicitly or explicitly.

One example way of realizing this is to provide a URL of a target resource as a query parameter for the URL of the responsible request handler as in the following example.

Original URL to the target resource: http://192.168.1.200/video.mpg
Warpped: warp://erlabs:gateway/123/proxy?content=http://192.168.1.200/video.mpg If an intermediate component such as SB and PN gateway performs modification of the resource URLs as in the above when content metadata on a private media server is browsed, the requesting Web application can send a request to the correct request handler and indicate the requested target resource.

Another way is to agree on a rule of generating a URL. For example, if the SB is designed to redirect a request from the Web application which has device URI with query parameter "content" is routed to the request handler that resides in the same local network as the target resource, the requests can be correctly routed.
Device URI: warp://pnas:sb/alice/device/uuid:123
Request to get content: GET
warp://pnas:sb/alice/device/uuid:123?content=http://192.168.1.200/video.mpg As far as the requests are routed to the request handler, the embodiments work no matter how the requests are generated and routed.

Accordingly a method in a server of a private network for dynamically setting up a session between a target resource in the private network and a device which may be located outside the private network is provided.

In the method in the server a request to get the target resource in the private network is received 301 from the application, it is then checked 302 if the user of the device is authorized to access the server, and a session anchor is identified 303. A proxy agent is instantiated 304 within the private network with address information of the identified session anchor such that the proxy agent can establish a connection to the session anchor identified by said address information.

In response to the instantiating, a session URL is received and a mapping between an URL of the target resource and a session URL issued by said session anchor is performed. Furthermore, it is determined 306 whether the device and the target resource is on the same Local Area Network, LAN, such that the application can access the target resource directly if they are on the same LAN, or such that the application can access the target resource via the session anchor by using the session URL if they are not on the same LAN.

According to a further embodiment, the determining step 306 is performed by sending the session URL to an additional server (also referred to as a rendezvous server) such that the additional server is used to determine whether the device and the target resource is on the same LAN.

The additional server may be used by registering 306a to the additional server, wherein the register comprises the session URL and the URL of the target resource, receiving 306b in response to said register, a point URL of the additional server, sending 306c said point URL of the additional server to the application such that the application can inform the additional server of the URL of the device, whereby the additional server can compare the URL of the device with the URL of the target resource to determine whether the device and the target resource are on the same LAN such that the application can access the target resource directly if they are on the same LAN or access the target resource via the session anchor is they are located on different LANs.

In addition, a method in a proxy agent of a private network for dynamically setting up a session between a target resource in the private network and an application on a device is provided. The device belongs to the private network but may be located remotely from the private network. The application sends a request to a server in the private network to get the target resource and the server is configured to authorize the device to authorize access to the server and an URL of a session anchor is identified by the server. In the method, a request to instantiate the proxy agent with address information of the identified session anchor is received 304, and a session request to the session anchor is sent 304a. Moreover, a session URL from the session anchor is received 304b and a mapping between said session URL and the target resource are stored.

The session URL is sent 305 to the server, such that the server can forward the session URL to the client, and a request from the client is received 308 via the session URL of the session anchor to get the target resource, mapping the session URL to the URL of the target resource, and a request is sent 309 to get the target resource, such that the target resource can be sent to the client.

Figure 6:
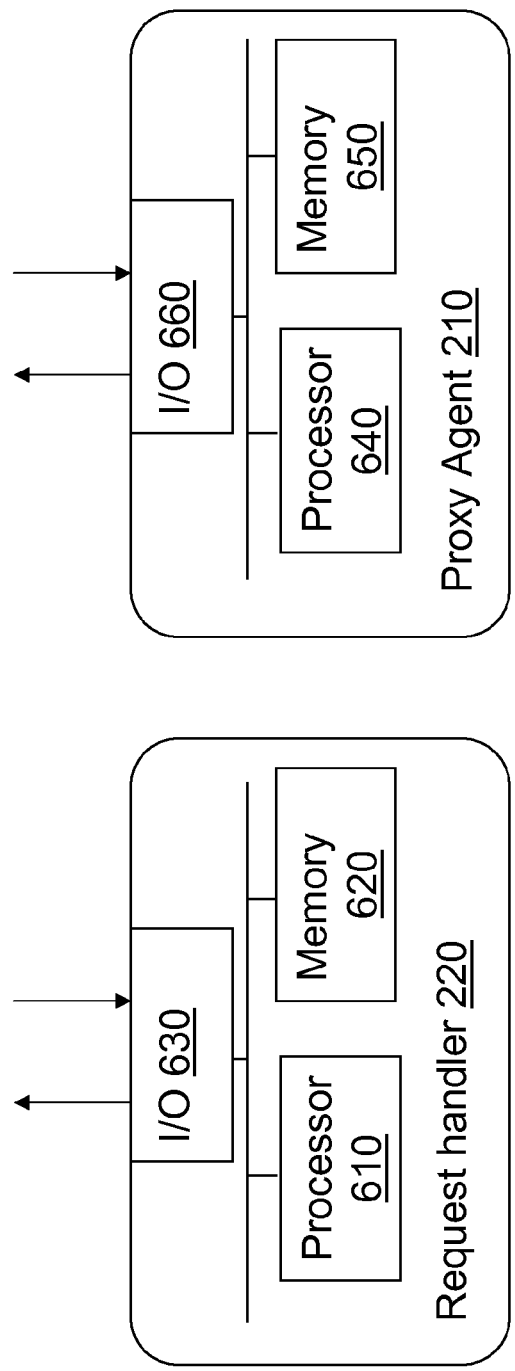
FIG. 6 shows schematically a server and a proxy agent according to embodiments of the present invention.

Turning now to FIG. 6 schematically illustrating the server referred to as the request handler and the proxy agent. The server 220 comprises an input/output section 630 configured to receive from the application 160 a request to get the target resource 200 in the private network 100, and a processor 610 configured to check if a user of the device is authorized to access the server 220 and to identify a session anchor 230 to instantiate a proxy agent within the private network with address information of the identified session anchor such that the proxy agent can establish a connection to the session anchor identified by said address information. Further the input/output section 630 is configured to receive a session URL in response to said instantiating and to perform a mapping between an URL of the target resource and a session URL issued by said session anchor. The processor 610 is further configured to determine whether the device 150 and the target resource 200 is on the same LAN such that the application 160 can access the target resource 200 directly if they are on the same LAN, or such that the application 160 can access the target resource 200 via the session anchor 230 by using the session URL if they are not on the same LAN. It should be noted that the mapping between the URL of the target resource and the session URL issued by said session anchor may be stored in a memory 620.

According to a further embodiment, the processor is configured to use the input/output section 630 to send the session URL to an additional server such that the additional server is used to determine whether the device and the target resource is on the same LAN The input/output section 630 may be configured to register to the additional server, wherein the register comprises the session URL and the URL of the target resource, to receive in response to said register, a point URL of the additional server, and to send said point URL of the additional server to the application such that the application can inform the additional server of the URL of the device. The additional server can compare the URL of the device with the URL of the target resource to determine whether the device and the target resource are on the same LAN such that the application can access the target resource directly if they are on the same LAN or access the target resource via the session anchor is they are located on different LANs.

According to a further aspect a proxy agent 210 is provided. The proxy agent 210 comprises an input/output section 660 configured to receive a request to instantiate the proxy agent with address information of the identified session anchor, to send a session request to the session anchor, and to receive a session URL from the session anchor. The proxy agent further comprises a memory 650 configured to store a mapping between said session URL and the target resource. The input/output section 660 is further configured to send the session URL to the server, such that the server can forward the session URL to the client, to receive a request from the client via the session URL of the session anchor to get the target resource. The proxy agent further comprises a processor 640 configured to map the session URL to the URL of the target resource, and the input/output section is further configured to send a request to get the target resource, such that the target resource can be sent to the client.

As mentioned above, a method in an additional server, also referred to rendezvous server, for dynamically setting up a session between a target resource in a private network and a device may be performed. The additional server determines 306 whether the client and the target resource is on the same LAN such that the client can access the target resource directly if they are on the same LAN, or such that the client can access the target resource via the session anchor by using the session URL.

Furthermore, a method in a client for dynamically setting up a session between a target resource in a private network and the device may also be performed. In the method, a request to get the target resource in the private network is sent to the request handler, wherein it is being checked if a user of the device is authorized to access the server and a session anchor is identified. Further a proxy agent within the private network is instantiated with address information of the identified session anchor such that the proxy agent can establish a connection to the session anchor and obtain a session URL in reply to the connection establishment and maintain a mapping between an URL of the target resource and said session URL. The client receives 305 an additional server point URL in response to said request, and the additional server is used to determine whether the device and the target resource is on the same LAN. The target resource is accessed directly if they are on the same LAN, or otherwise the target resource is accessed via the session anchor by using the session URL.

The functionalities of the device and the additional server can be realised by a respective processor, a respective memory and respective input/output section similar to the architecture of the server 220. Hence, a processor of the device and the additional server, respectively is configured to perform the functionalities while the respective input/output sections are configured to send/receive different messages. The memory of the respective device and the additional server can be used to store software code portions to be run by the processor for performing the above stated functionality.

In the following it will be described how the embodiments can be applicable for Device-to-Device remote access where the remote device supports WARP and the target resource is a HTTP resource. This is useful for e.g. a home-to-home remote access solution.

A case where a user operates a DLNA DMP in a private network is considered. The user browses a content list in a DLNA DMS in another private network connected via a WAN connection, and plays content in the DMS in the remote private network on the DMP in the local private network. In this case, the DMP needs to perform remote access somehow because pure DLNA devices do not have remote access functionality by themselves.

The WDC architecture supports the first half of the above use case, i.e. browsing contents in a remote NAS, by having a PN gateway per a private network and a virtual DLNA device which proxies UPnP commands in another private network. However, in order to enable the latter half, i.e. playing back a media content, it needs to utilize the embodiments of the present invention.

Figure 5:
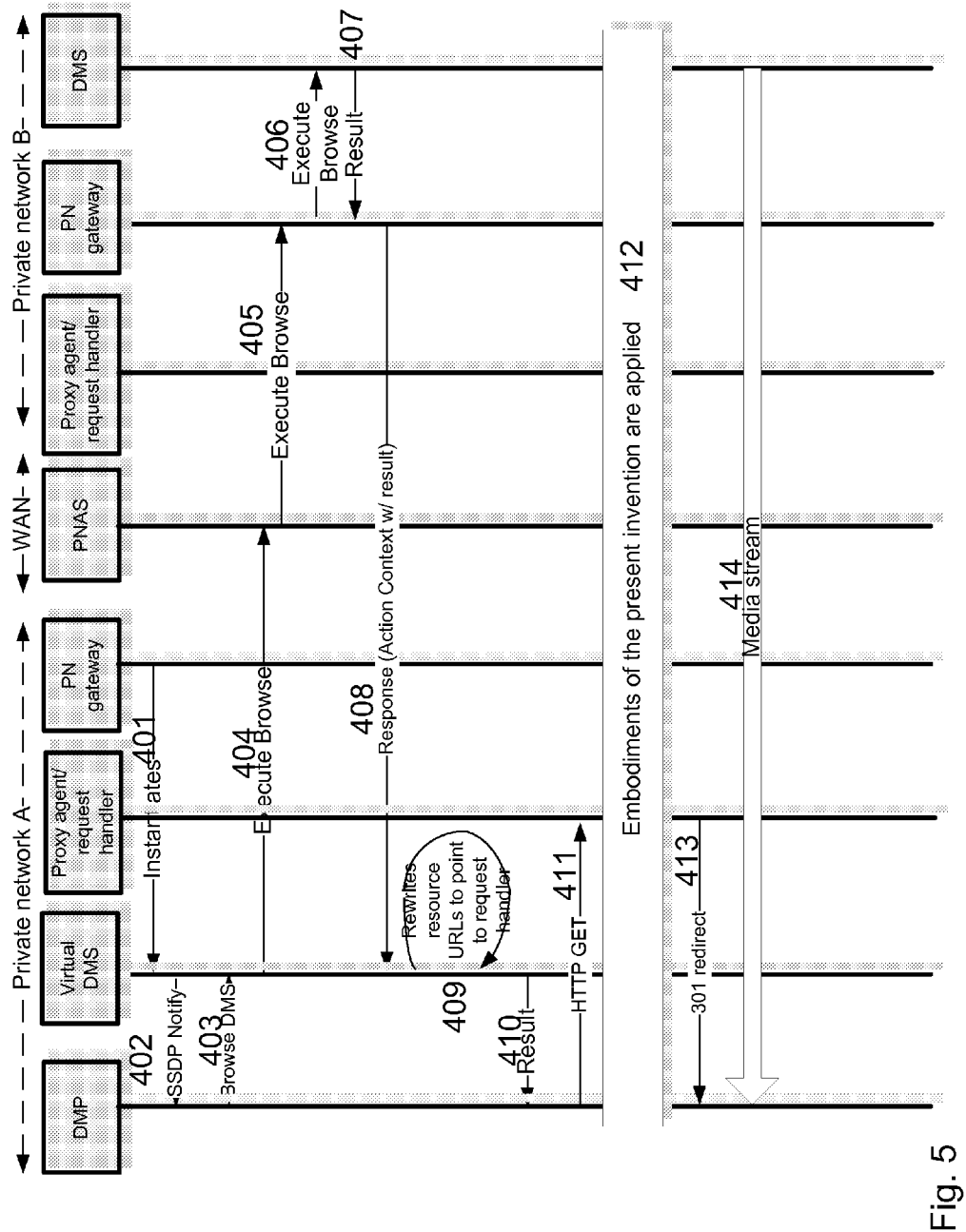
FIG. 5 is a signaling diagram illustrating a scenario where the embodiments can be applied.

This is illustrated in the signaling diagram of FIG. 5.

401. PN gateway in private network A instantiates a virtual DLNA device which mimics the target DMS in private network B

402. DMP in private network A discovers the virtual DMS by receiving a SSDP Notify.

The user operates the DMP and chooses the virtual DMS

403. The DMP sends "Browse" command to the virtual DMS

404. The virtual DMS issues "Browse" command to PNAS over WARP (Note: PNAS knows which devices exist under which PN gateway.)

405. PNAS dispatches the "Browse" request to the responsible PN gateway, i.e. the PN gateway in private network B.

406. The PN gateway in private network B issues "Browse" command to the target DMS by UPnP.

407. The target DMS responds as usual.

408. The PN gateway in private network B returns the result to the virtual DMS.

409. The virtual DMS rewrites content URLs in the response so that they point to the request handler in the proxy and sends it to the DMP.

410. The user operates the DMP to play a content
411. The DMP issues an HTTP request to the proxy. (Note that the content URLs are rewritten by the virtual DMS)
412. The HTTP/WARP proxy applies the embodiments of the present invention as described in context of FIG. 3 and gets an URL for the DMP to access.
413. The proxy sends a 301 redirect to the DMP with specifying the obtained URL in the Location header.
414. The DMP gets the content Although the sequence described in conjunction with FIG. 3 can be applied for Step 412 in the above, there are two optimizations possible in this case.

In a first case a rendezvous server is not required because the case where the server and the client are in a same LAN does not need to be considered and the client is not a web browser. In a second case, two proxies are used which have the possibility to host a session anchor, hence the chance to be able to use a local session anchor is increased. The second proxy at the requester side takes care of making WARP request instead of the end device.

In this embodiment, it is possible to also deploy rendezvous servers and session anchors on PN gateways which have a global IP address or a mapped port to accept incoming TCP connections. PNAS should be able to keep track of available rendezvous servers and session anchors by letting them publish the availability and distribute requests to them by piggying back URLs over WARP signaling with WARP request handler. Such a hybrid P2P type deployment has advantage in terms of load distribution.

In all embodiments described above, the target resource may be a HTTP resource which implies that the request handler, proxy agent, session anchor and the additional server are HTTP enabled devices. Further, the embodiments may also rely on Warp functionality in the network which implies that the remote device and the request handler are implemented with Warp functionalities.

Modifications and other embodiments of the disclosed invention will come to mind to one skilled in the art having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method executed by a processor in a server of a private network for dynamically setting up a session between a target resource in the private network and an application on a device, wherein the device belongs to the private network, the method comprises:
   receiving, by the server, from the application a request to get the target resource in the private network,
   checking, by the server, if a user of the device is authorized to access the server,
   identifying, by the server, a session anchor,
   instantiating, by the server, a proxy agent within the private network with address information of the identified session anchor such that the proxy agent can establish a connection to the session anchor identified by said address information,
   receiving, by the server, a session Universal Resource Locator, URL, in response to said instantiating and performing a mapping between a URL of the target resource and a session URL issued by said session anchor, and
   determining, by the server, whether the device and the target resource are on the same private network, such that the application can access the target resource directly if they are on the same private network, or such that the application can access the target resource via the session anchor by using the session URL if they are not on the same private network.

2. The method according to claim 1, wherein the identified session anchor is located locally in the private network.

3. The method according to claim 1, wherein the identified session anchor is located in a cloud outside the private network reachable over an IP network.

4. The method according to claim 1, wherein the determining step is performed by sending, by the server, the session URL to an additional server such that the additional server is used to determine whether the device and the target resource are on the same private network.

5. The method according to claim 4, wherein the additional server is used by:
   registering, by the server, to the additional server, wherein the register comprises the session URL and the URL of the target resource,
   receiving, by the server, in response to said register, a point URL of the additional server,
   sending, by the server, said point URL of the additional server to the application such that the application can inform the additional server of the URL of the device, whereby the additional server can compare the URL of the device with the URL of the target resource to determine whether the device and the target resource are on the same private network such that the application can access the target resource directly if they are on the same private network or access the target resource via the session anchor if they are located on different private networks.

6. A method executed by a processor in a proxy agent of a private network for dynamically setting up a session between a target resource in the private network and an application on a device, wherein the device belongs to the private network, the application sends a request to a server in the private network to get the target resource and the server is configured to authorize a user of the device to authorize access to the server and a Universal Resource Locator, URL, of a session anchor is identified by the server, the method comprising:
   receiving, by the proxy agent, a request to instantiate the proxy agent with address information of the identified session anchor,
   sending, by the proxy agent, a session request to the session anchor,
   receiving, by the proxy agent, a session URL from the session anchor and storing, in the proxy agent, a mapping between said session URL and the target resource,
   sending, by the proxy agent, the session URL to the server, such that the server can forward the session URL to the client,
   receiving, by the proxy agent, a request from the client via the session URL of the session anchor to get the target resource, mapping, by the proxy agent, the session URL to the URL of the target resource, and
   sending, by the proxy agent, a request to get the target resource, such that the target resource can be sent to the client.

7. The method according to claim 6, wherein the identified session anchor is located locally in the private network.

8. The method according to claim 6, wherein the identified session anchor is located in a cloud outside the private network reachable over an IP network.

9. A server of a private network for dynamically setting up a session between a target resource in the private network and an application on a device wherein the device belongs to the private network, the server comprises an input/output section configured to receive from the application a request to get the target resource in the private network and a processor configured to check if a user of the device is authorized to access the server to identify a session anchor to instantiate a proxy agent within the private network with address information of the identified session anchor such that the proxy agent can establish a connection to the session anchor identified by said address information, wherein the input/output section is further configured to receive a session Universal Resource Locator, URL, in response to said instantiating and performing a mapping between a URL of the target resource and a session URL issued by said session anchor, and wherein the processor is further configured to determine whether the device and the target resource are on the same private network, such that the application can access the target resource directly if they are on the same private network, or such that the application can access the target resource via the session anchor by using the session URL if they are not on the same private network.

10. The server according to claim 9, wherein the identified session anchor is located locally in the private network.

11. The server according to claim 9, wherein the identified session anchor is located in a cloud outside the private network reachable over an IP network.

12. The server according to claim 9, wherein the processor is further configured to use the input/output section to send the session URL to an additional server such that the additional server is used to determine whether the device and the target resource are on the same private network.

13. The server according to claim 9, wherein the input/output section is further configured to register to the additional server, wherein the register comprises the session URL and the URL of the target resource, to receive in response to said register, a point URL of the additional server, and to send said point URL of the additional server to the application such that the application can inform the additional server of the URL of the device, whereby the additional server can compare the URL of the device with the URL of the target resource to determine whether the device and the target resource are on the same private network such that the application can access the target resource directly if they are on the same private network or access the target resource via the session anchor if they are located on different private networks.

14. A proxy agent of a private network for dynamically setting up a session between a target resource in the private network and an application on a device wherein the device belongs to the private network, the application is configured to send a request to a server in the private network to get the target resource and the server is configured to authorize a user of the device to authorize access to the server and a Universal Resource Locator, URL of a session anchor is identified by the server, the proxy agent comprising an input/output section configured to receive a request to instantiate the proxy agent with address information of the identified session anchor, to send a session request to the session anchor, and to receive a session URL from the session anchor, wherein the proxy agent further comprises a memory configured to store a mapping between said session URL and the target resource, and the input/output section is further configured to send the session URL to the server, such that the server can forward the session URL to the client, and to receive a request from the client via the session URL of the session anchor to get the target resource, wherein the proxy agent further comprises a processor configured to map the session URL to the URL of the target resource, and the input/output section is further configured to send a request to get the target resource, such that the target resource can be sent to the client.

15. The proxy agent according to claim 14, wherein the identified session anchor is located locally in the private network.

16. The proxy agent according to claim 14, wherein the identified session anchor is located in a cloud outside the private network reachable over an IP network.

* * * * *